J. TAYLOR, Jr. & J. PREST.
Bearings for Spindles.
No. 135,295. Patented Jan. 28, 1873.
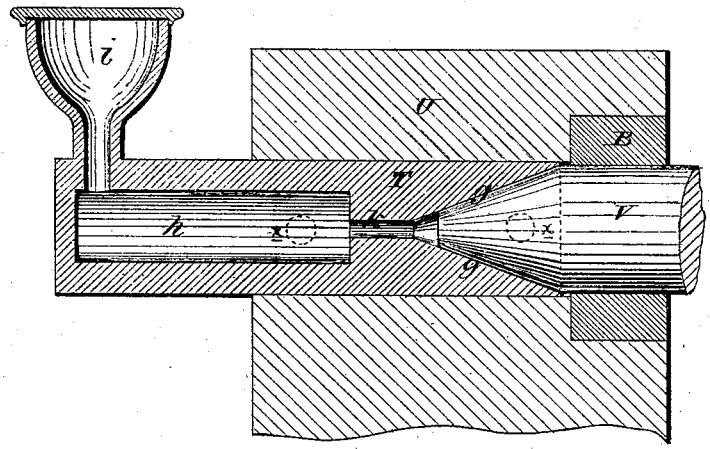

UNITED STATES PATENT OFFICE.

JOSEPH TAYLOR, JR., AND JAMES PREST, OF SHEFFIELD, ENGLAND.

IMPROVEMENT IN BEARINGS FOR SPINDLES.

Specification forming part of Letters Patent No. 135,295, dated January 28, 1873.

*To all whom it may concern:*

Be it known that we, JOSEPH TAYLOR, the younger, saw-manufacturer, and JAMES PREST, engineer, both of Sheffield, in the county of York and Kingdom of England, have invented Improvements in Bearings, of which the following is a specification:

This invention relates to an improved bearing, applicable in all cases where it is important to maintain the spindles of machinery perfectly parallel and central, and for spindles, &c., running at high speeds. For this purpose we employ, in combination with a solid bored or bushed bearing, an adjustable, hollow, conical bush of hard cast metal or other suitable material into and by which the correspondingly-tapered ends of the spindle enter and are partly supported, the parallel or cylindrical portion of the journal of the spindle being supported in the cylindrical part of the solid or bushed bearing. Oil or other lubricating medium is supplied through the hollow portions of the adjustable bushes from oil-cups fitted or cast thereon, and the said bushes are set up or tightened, as required, by simply driving them further in and fixing them by set-screws or otherwise. Adjustable bearings of this construction are obviously applicable to all shafts or spindles revolving at high velocities.

The drawing annexed represents a longitudinal section of one of our improved adjustable bearings.

This improved bearing consists of the adjustable hollow conical bush, T, which is fitted into any solid bored or bushed bearing, U. The spindle which is intended to work in these bearings has its ends tapered or made conical, to correspond to the hollow conical cavity $g$ in the bush T. The end of the bush in which the conical cavity is formed does not protrude beyond the solid bored bearing U, so that the cylindrical portion of the spindle or shaft V may take its bearing in the solid bored or bushed bearing U, while at the same time a perfect centering is obtained by the fitting together of the two conical surfaces. It is obvious that the hollow cone may be made on the end of the spindle and the corresponding solid cone formed on the end of the bush T. An oil-chamber, $h$, is made in the bush, which is fitted with an oil-cup, $i$, and a small aperture, $k$, is drilled inside the bush, so as to connect the oil-chamber with the rubbing-surfaces of the two cones. Set-screws $x$ are fitted into the solid bearings, for the purpose of fixing the position of the bushes therein.

It is preferred to make this bearing with a hardened bush, B, so that at any time it may be replaced by a new one without damage to the solid bearing, &c.

Claims.

1. The combination, with an ordinary solid bored or bushed bearing, of an adjustable bush of hard metal, made conical at one end, for maintaining in position a revolving shaft or spindle, substantially as hereinbefore described, and illustrated by our drawing.

2. The combination of the oil-chamber, oil-cup, and aperture $k$, with the said adjustable conical bush, as and for the purpose hereinbefore described, and illustrated by our drawing.

In witness whereof we, the said JOSEPH TAYLOR, the younger, and JAMES PREST, have signed our names to this specification in the presence of two subscribing witnesses.

JOSEPH TAYLOR, JR.
    JAMES PREST.

Witnesses:
 V. V. HIBBERT,
  *U. S. Consulate Clerk.*
 JOHN SURFT,
  *5 Thorp Road, Sheffield.*